United States Patent
Moroney et al.

(10) Patent No.: US 9,282,103 B2
(45) Date of Patent: Mar. 8, 2016

(54) RESTRICTION LISTS FOR REMOTE VIDEO TRANSFER

(71) Applicant: General Instrument Corporation, Horsham, PA (US)

(72) Inventors: Paul Moroney, La Jolla, CA (US); Jay W Strater, San Diego, CA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

(21) Appl. No.: 14/214,485

(22) Filed: Mar. 14, 2014

(65) Prior Publication Data

US 2014/0344894 A1 Nov. 20, 2014

Related U.S. Application Data

(60) Provisional application No. 61/801,291, filed on Mar. 15, 2013.

(51) Int. Cl.
| | |
|---|---|
| H04N 21/654 | (2011.01) |
| H04L 29/06 | (2006.01) |
| H04N 21/222 | (2011.01) |
| H04N 21/258 | (2011.01) |
| H04N 21/41 | (2011.01) |
| H04N 21/436 | (2011.01) |
| H04N 21/4367 | (2011.01) |

(52) U.S. Cl.
CPC .............. *H04L 63/101* (2013.01); *H04L 63/10* (2013.01); *H04L 65/4069* (2013.01); *H04N 21/2221* (2013.01); *H04N 21/25816* (2013.01); *H04N 21/25841* (2013.01); *H04N 21/4126* (2013.01); *H04N 21/4367* (2013.01); *H04N 21/43622* (2013.01); *H04L 65/1036* (2013.01)

(58) Field of Classification Search
CPC ....... H04L 63/101; H04L 65/60; H04L 63/10; H04N 21/654
USPC ............................................................. 726/4
See application file for complete search history.

(56) References Cited

U.S. PATENT DOCUMENTS

| | | | |
|---|---|---|---|
| 7,380,123 B1* | 5/2008 | Hernacki et al. ............... | 713/168 |
| 2002/0066029 A1* | 5/2002 | Yi .................................. | 713/201 |
| 2002/0071386 A1* | 6/2002 | Gronke ......................... | 370/217 |
| 2003/0065791 A1 | 4/2003 | Garg et al. | |
| 2009/0235347 A1* | 9/2009 | Syed et al. ..................... | 726/10 |
| 2010/0082832 A1 | 4/2010 | Wiger | |

OTHER PUBLICATIONS

Schulzrinne et al. (RTP: A Transport Protocol for Real-Time Applications, RFC 3550, Jul. 2003, 89 pages).*
Hamilton (Managing Your Amazon Instant Video Library, 10 pages, Jan. 30, 2013).*
PCT Search Report & Written Opinion, Re: Application #PCT/US2014/029754; dated Jul. 30, 2014.

* cited by examiner

*Primary Examiner* — Saleh Najjar
*Assistant Examiner* — Oleg Korsak
(74) *Attorney, Agent, or Firm* — Thomas A. Ward

(57) ABSTRACT

A method of granting a client device remote access to a media server after receiving a port request from a remote client device at a residential gateway through an intermediate remote access control server by opening one or more wide area network ports temporarily mapped to local area network ports, such that the remote client device can communicate with the media server through the wide area network ports, transmitting a list of the one or more wide area network ports to the remote client device through the remote access control server, receiving a media content request from the remote client device and passing the media content request to the media server through the one or more wide area network ports, and passing media content from the media server to the remote client device through the one or more wide area network ports according to one or more restriction lists.

16 Claims, 3 Drawing Sheets

RESTRICTION LISTS FOR REMOTE VIDEO TRANSFER

CLAIM OF PRIORITY

This Application claims priority under 35 U.S.C. §119(e) from earlier filed U.S. Provisional Application Ser. No. 61/801,291, filed Mar. 15, 2013, which is hereby incorporated by reference.

TECHNICAL FIELD

The present disclosure relates to the field of digital video recorders, particularly a system for providing a remote client device with access to streaming or downloadable video from a media server.

BACKGROUND

Consumers have come to enjoy accessing media content on-demand on non-television devices, such as mobile phones or tablet computers, by streaming media content over the internet or downloading media content to the device. Consumers also enjoy watching television broadcasts, either in real time or through digital video recorders (DVRs) whereby broadcasts can be recorded and viewed at a later time.

Consumers can be provided with access to media content stored on media servers such as DVRs by streaming or downloading media files from the media server to a client device. However, when the client device is located on a different network than the media server, such as when the client device is away from home and is not connected to a home local area network on which the media server is connected, it can be unclear whether the client device is authorized to communicate with and exchange data with the media server on the local area network remotely through the internet or other wide area network. Additionally, it can be unclear whether or not the particular media content requested by a remote client device is authorized to be streamed to or downloaded by the requesting remote client device.

SUMMARY

What is needed is a method of authorizing a remote client device connected to a wide area network to communicate with a media server on a local area network through a residential gateway. The remote client device can submit a request to a remote access control server, which in turn can request that a residential gateway connected to the media server open temporary WAN ports for the remote client device. The media server can use one or more restriction lists to determine whether or not the requested media content is authorized to be streamed to or downloaded by the requesting remote client device.

In one embodiment, the present disclosure provides a method of granting a client device remote access to a media server after receiving a port request from a remote client device at a residential gateway through an intermediate remote access control server over a wide area network, the residential gateway operating a local area network to which a media server is connected, by opening one or more wide area network ports temporarily mapped to local area network ports, such that the remote client device can communicate with the media server through the wide area network ports, transmitting a list of the one or more wide area network ports to the remote client device through the intermediate remote access control server, receiving a media content request from the remote client device and passing the media content request to the media server through the one or more wide area network ports, and passing media content from the media server to the remote client device through the one or more wide area network ports in response to the media content request, wherein the media server uses one or more restriction lists to determine whether to send the media content to the remote client device.

BRIEF DESCRIPTION OF THE DRAWINGS

Further details of the present invention are explained with the help of the attached drawings in which.

DETAILED DESCRIPTION

Figure 1:
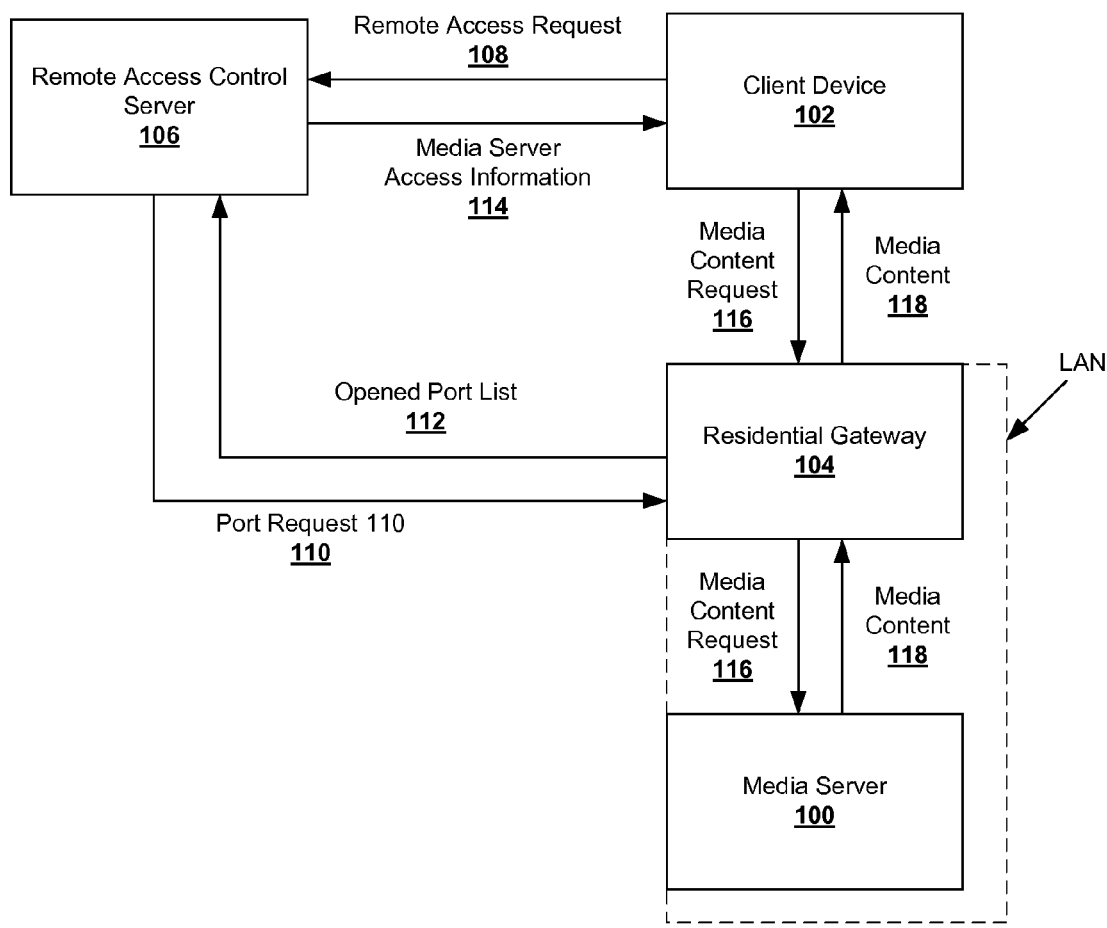
FIG. 1 depicts an exemplary embodiment of a system for remotely streaming and/or transferring media content between a Media Server and a Client Device securely through a residential gateway connected to the Media Server.

FIG. 1 depicts an exemplary embodiment of a system for remotely streaming and/or transferring media content between a Media Server 100 and a Client Device 102 securely through a residential gateway 104 connected to the Media Server 100. A Media Server 100 can be a device, system or application such as a home media gateway, digital video recorder, or any other server or device that records, hosts, and/or transmits media content to other devices. By way of a non-limiting example, a Media Server 100 can be a home media gateway that can receive and/or record television broadcasts, and can transmits received and/or recorded video to one or more televisions in a home and/or to one or more Client Devices 102. A Client Device 102 can be a mobile phone, tablet computer, computer, gaming device, personal media device, or any other device that can stream or receive media content for playback on the Client Device 102.

The residential gateway 104 can manage, maintain, and/or provide access to a local area network (LAN) within a home or other location. A residential gateway 104 can be a router, firewall, access point, modem and/or any other device or component that operates and/or provides access to a LAN. In some embodiments the residential gateway 104 can be a router, modem, or other device provided by a telecommunications service provider, such as an entity that also provided a user with the Media Server 100, that is configured to operate a LAN within the user's home, office, or other location. In other embodiments the residential gateway 104 can be provided by a user as part of an existing LAN within the user's home, office, or other location. The Media Server 100 can be in data communication with the LAN, such that the Media Server 100 can send and/or receive data over the LAN using TCP/IP or other protocols.

In some situations and/or embodiments, a Media Server 100 connected to the LAN can transmit media content to one or more Client Devices 102 when the Client Devices 102 are connected directly to the LAN through a wired or wireless connection. However, many residential gateways 104 prevent or limit access to LANs from external devices through firewalls or network address translation/network address and port translation (NAT/NAPT). In these situations, a Client Device 102 that is not connected to the LAN can be precluded from obtaining media content from the Media Server 100 on the LAN unless the Client Device 102 connects to the residential gateway 104 through the processes described below. By way of a non-limiting example, a remote Client Device 102 can connect to a residential gateway 104 through a Wide Area Network (WAN) to securely request and receive media content from a Media Server 100 connected to a LAN within in a particular home, even when the remote Client Device 102 is located outside that particular home and is not connected to that home's LAN.

Figure 2:
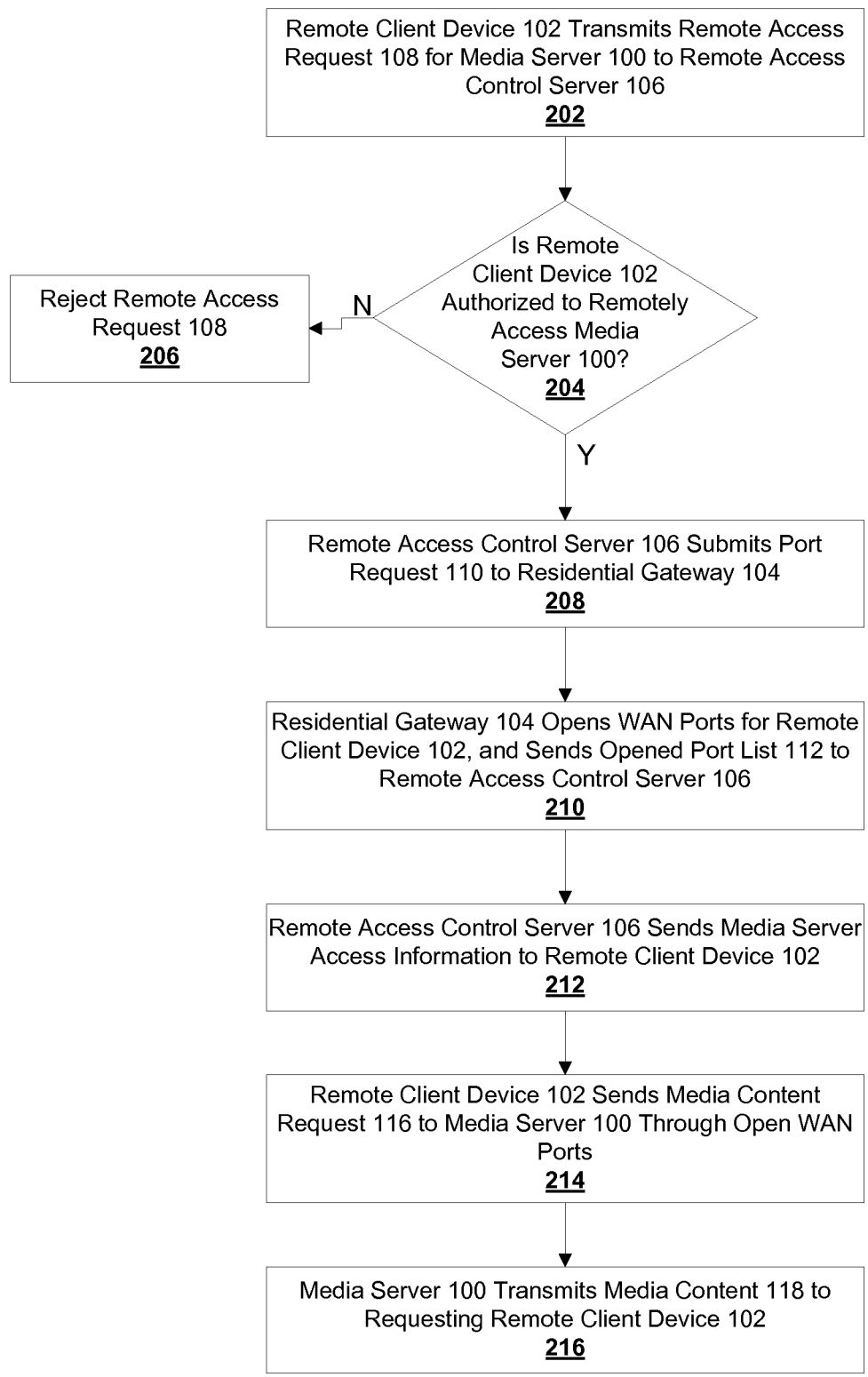
FIG. 2 depicts a process for a Client Device to request remote access to a Media Server on a LAN when the Client Device is not connected to the LAN.

FIG. 2 depicts a process for a Client Device 102 to request remote access to a Media Server 100 on a LAN when the Client Device 102 is not connected to the LAN. At step 202, a Client Device 102 can transmit a remote access request 108 to a Remote Access Control Server 106. In some embodiments, the data connection between the Client Device 102 and the Remote Access Control Server 106 can be established as a secure connection, such as a two-way Secure Sockets Layer (SSL) connection secured for Denial of Service (DOS) mitigation.

The remote access request 108 sent from a Client Device 102 to the Remote Access Control Server 106 can be a message that requests that the Client Device 102 be provided with access to a Media Server 100 through a residential gateway 104 connected to the Media Server 100. In particular, the remote access request 108 can request a list of WAN ports that can be used to communicate with the Media Server 100 through the residential gateway 104. In some embodiments, the remote access request 108 can further include a request for a network location, such as an IP address or URL, for the residential gateway 104, although in other embodiments the Client Device 102 can already know the network location of the residential gateway 104. The remote access request 108 can also include a Client ID that uniquely identifies the Client Device 102 submitting the remote access request 108.

At step 204, the Remote Access Control Server 106 can determine whether the Client ID in the remote access request 108 appears on a device authorization list. The Remote Access Control Server 106 can maintain one or more device authorization lists. A device authorization list can include the Client IDs of Client Devices 102 that have been authorized to communicate remotely with a particular Media Server 100. By way of a non-limiting example, a cable television subscriber who has been provided with a Media Server 100 for use in his home can request that his mobile phone be authorized to obtain media content from that Media Server 100, and the Client ID for that mobile phone can be stored in a device authorization list associated with the subscriber's Media Server 100 on the Remote Access Control Server 106. If the Client ID contained in the remote access request 108 appears on the authorization list, the Remote Access Control Server 106 can proceed to step 208. If the Client ID contained in the remote access request 108 does not appear on the authorization list, the Remote Access Control Server 106 can reject the remote access request 108 at step 206.

In some embodiments, the Remote Access Control Server 106 can further determine whether the Media Server 100 is currently accessible and available to stream media content to the requesting Client Device 102. By way of a non-limiting example, in some embodiments the Media Server 100 can periodically send status messages to the Remote Access Control Server 106 indicating that the Media Server 100 is turned on and is available for media transfer, or send status messages if the Media Server's status changes. In these embodiments, if the Remote Access Control Server 106 has not received a status message indicating that the Media Server 100 is available within a predetermined period of time, an error message can be sent to the Client Device in response to its remote access request 108. In some embodiments, the data connection between the Media Server 100 and the Remote Access Control Server 106 can be established as a secure connection, such as a two-way Secure Sockets Layer (SSL) connection secured for Denial of Service (DOS) mitigation.

In some embodiments, a Media Server 100 can further include information in its status messages to the Remote Access Control Server 106 indicating its serial number or other identifier, channel identifiers for channels that the Media Server's tuners are currently tuned to, network information of the LAN, IP address or URLs for the residential gateway 104, a list of opened ports, Client IDs of Client Devices 102 that have been authorized to communicate with the Media Server 100, or any other information. By way of a non-limiting example, the authorization list used during step 206 can be generated by the identities of authorized Client Devices 102 indicated in a Media Server's status message. In alternate embodiments, status messages sent from the Media Server 100 to the Remote Access Control Server 106 can be optional, and/or the Remote Access Control Server 106 does not check for such status messages before moving to the next step.

At step 208, if the remote access request 108 was confirmed during step 204 to include a Client ID that appears on a device authorization list associated with the Media Server 100, the Remote Access Control Server 106 can submit a port request 110 to the residential gateway 104 associated with the Media Server 100. The port request 110 can request that the residential gateway 104 open WAN ports for the requesting Client Device 102. In some embodiments, the Remote Access Control Server 106 can be in asynchronous contact with the residential gateway 104. By way of a non-limiting example, in some embodiments the Remote Access Control Server 106 can use TR-069 signaling to interface with the residential gateway via a TR-069 Auto Configuration Server (ACS) to request that the residential gateway 104 open WAN ports for the Client Device 102.

At step 210, the residential gateway 104 can open WAN ports, such that the Client Device 102 can use the WAN ports to communicate over the WAN through the residential gateway 104 with the Media Server 100 through TCP/IP-based messaging or any other messaging protocol. In some embodiments, the opened WAN ports can be temporary ports referred to as pinholes that are mapped to LAN ports associated with the Media Server 100. The residential gateway 104 can return an Opened Port List 112 that lists the opened WAN ports to the Remote Access Control Server 106. In alternate embodiments, an Opened Port List 112 can be a part of a periodic status message sent from the Media Server 100 to the Remote Access Control Server 106 as described above.

In some embodiments, the residential gateway 104 can open a triplet of WAN ports, with each of the three WAN ports opened for a particular type of signaling, as will be discussed below. The WAN ports can be randomly selected, and can be closed after the media content streaming or transfer has completed. In some embodiments, randomly selected WAN ports can be selected from within a preconfigured range of ports. In some embodiments, the second and third WAN ports can be offset by one and two integers respectively from the WAN port randomly selected as the first WAN port. By way of a non-limiting example, when the first WAN port is selected as port 6000, the second and third WAN ports can respectively be 6001 and 6002. In other embodiments, all three WAN ports can be selected at random, or can be selected in any other manner. In still other embodiments, more or less than three WAN ports can be opened by the residential gateway as desired.

In embodiments in which three WAN ports are opened, a first WAN port can be opened at the residential gateway 104 to allow web service signaling between the Client Device 102 and the Media Server 100. In some embodiments, this first pinhole can be temporarily mapped to HTTPS port 443, or any other desired port that allows communication with the Media Server 100.

In these embodiments, a second WAN port can be opened at the residential gateway 104 to allow media requests, content, playlists, and/or any other content or request to be exchanged between the Client Device 102 and the Media Server 100. By way of a non-limiting example, HTTP Live Streaming (HLS) playlists, chunks of media content, requests for complete recordings of media content, and/or any other content request, can be passed through the second WAN port.

In these embodiments, a third WAN port can be opened at the residential gateway 104 to allow security or digital rights management communications to be exchanged between the Client Device 102 and the Media Server 100. By way of non-limiting examples, information regarding copy protection schemes such as DTCP-IP (Digital Transmission Content Protection over Internet Protocol), SecureMedia-HN, or any other digital rights management scheme, can be exchanged through the third WAN port between the Client Device 102 and Media Server 100.

At step 212, the Remote Access Control Server 106 can return Media Server Access Information 114 to the Client Device 102 that submitted the remote access request 108. The Media Server Access Information 114 can include list of the opened WAN ports obtained from the Opened Port List 112. If the remote access request 108 included a request for the residential gateway's network location, the Media Server Access Information 114 can also include an IP address or URL for the residential gateway 104. Alternatively, if the Media Server 100 or residential gateway 104 was not found, or was not available, the Remote Access Control Server 106 can return an error message to the requesting Client Device 102.

At step 214, the Client Device 102 can use the information in the Media Server Access Information 114, such as the residential gateway's IP address or URL and/or list of opened WAN ports, to submit a media content request 116 to the Media Server 100 through the residential gateway 104. By way of a non-limiting example, the Client Device 102 can request a stream of a recorded program saved on a hard drive at the Media Server 100, a stream of a live broadcast being received by the Media Server 100, a transfer of a completed recording such that a copy of the completed recording is transferred to and stored on the Client Device 102 for local playback, or any other request for media content.

In some embodiments, the media content request 116 from the Client Device 102 can indicate that the media content request 116 originated from a remote Client Device 102 not connected to the LAN, such that the Media Server 100 can determine that it should use adaptive transcoding when establishing remote streaming service with the Client Device 102 to account for variable network conditions. In alternate embodiments, the residential gateway 104 can indicate that the media content request 116 was received through a WAN port opened for remote access, or the Media Server 100 can determine that the media content request 116 passed through an opened WAN port, thereby indicating that the Client Device 102 is not connected to the LAN and adaptive transcoding should be used.

At step 216, the Media Server 100 can return the requested media content 118 to the Client Device 102 through the opened WAN ports at the residential gateway 104. In some embodiments, one or more restriction lists 300 can be used by the Media Server 100 or residential gateway 104 to determine if the requested media content 118 can be provided to the requesting Client Device 102, and how the media content 118 can be used by the Client Device 102.

Figure 3:
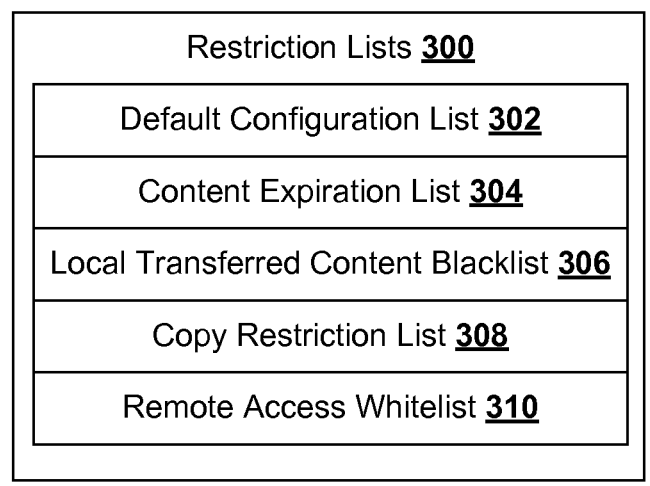
FIG. 3 depicts exemplary embodiments of restriction lists.

FIG. 3 depicts exemplary embodiments of restriction lists 300. As mentioned above, in some embodiments and/or situations the Media Server 100 or residential gateway 104 can use one or more restriction lists 300 when providing media content 118 to a remote Client Device 102. A restriction list 300 can describe one or more control parameters that can describe permissions and/or restrictions indicating how a Client Device 102 can use media content 118. By way of a non-limiting example, a restriction list 300 can include control parameters on a per-channel basis that indicate how media content 118 received from a particular channel that the Media Server 100 is or was tuned to can be transferred to and/or used by remote Client Devices 102. Restriction lists 300 can include a default configuration list 302, content expiration list 304, local transferred content blacklist 306, copy restriction list 308, and/or remote access whitelist 310.

A default configuration list 302 can describe a default maximum number of Client Devices 102 that can be provided with access to the media content 118. A default configuration list 302 can also describe a maximum limit of copies that are authorized to be made of or streamed of the media content 118. In embodiments and/or situations in which a copy of the media content 118 is transferred to a Client Device's local memory for local playback at a later time, a default configuration list 302 can also describe a default content expiration period, such that the locally stored copy of the media content 118 can expire and become unplayable after the default content expiration period has ended.

A content expiration list 304 can describe content expiration periods for particular instances of media content 118 that can override a default content expiration period found in a default configuration list 302. By way of a non-limiting example, a particular program recorded by a Media Server 100 can be set to expire earlier than most other programs that expire according to a default content expiration period.

In some embodiments, a Client Device 102 can use one or more keys provided by the Media Server 100 to decrypt encrypted media content 118, and the keys can expire after the duration of the content expiration period described by the default configuration list 302 or content expiration list 304.

A local transferred content blacklist 306 can describe the identities of media content 118 for which a copy is not authorized to be transferred to local storage in a Client Device 102, such that the Client Device 102 can stream that media content 118 but not save the media content 118 in its entirety to its local storage for later local playback. In some embodiments, media content 118 listed on a local transferred content blacklist 306 can be copied and/or transferred to a Client Device 102 that is directly connected to the Media Server 100 through a LAN, but such copying can be precluded when the Client Device 102 is connected to the Media Server 100 remotely through a WAN. In some embodiments, transfer and/or copying media content 118 can be unrestricted by default unless an identifier for the media content 118 appears on a local transferred content blacklist 306.

A copy restriction list 308 can describe a maximum limit of copies that are authorized to be made of or streamed of one or more particular instances of media content 118 or media content 118 from a particular channel, when that maximum limit differs from a default maximum copy limit described in the default configuration list 302. In some embodiments, each time a copy of recorded media content 118 is transferred by the Media Server 100 to a Client Device 102 to be stored locally on the Client Device 102 for later local playback, or is being streamed to a Client Device 102, the maximum limit of copies in the copy restriction list 308 can be decreased, such that the copy restriction list 308 describes the number of remaining authorized copies that can be made or streamed. In some embodiments, media content 118 can be "checked out" by downloading a copy to a Client Device's local storage or streaming to the Client Device 102 and "returned" by deleting the media content 118 from the Client Device's local storage or ceasing a stream, and in these embodiments the number of remaining authorized copies can be increased in the copy restriction list 308 when a copy is returned or a stream is ceased, such that it is no longer checked out by a Client Device 102. If the copy restriction list 308 indicates that no more copies of the media content 118 are authorized, then further requests from a Client Device 102 for a copy or stream of the media content 118 can be denied, and, in some embodiments, the media content 118 can be deleted from the Media Server 100.

A remote access whitelist 310 can describe rights permissions for an instance of media content 118 and/or some or all media content 118 received from a particular channel. A remote access whitelist 310 can indicate whether live and/or recorded media content 118 received from a particular channel by a Media Server 100 is approved for streaming to a remote Client Device 102, whether there is a limit on the number of concurrent streams for an instance of media content 118 and/or media content 118 from a particular channel, and/or whether a copy of the media content 118 is authorized to be sent to a requesting Client Device's local storage for later local playback. By way of a non-limiting example, a remote access whitelist 310 can include remote access permissions for a particular channel, indicating that media content 118 the Media Streamer receives live from that channel, or has previously recorded from that channel, can be streamed to one or more remote Client Devices 102 in response to a media content request 116.

If the remote access whitelist 310 indicates that media content 118 can be streamed to a remote Client Device 102, then the Media Server 100 can transmit a playlist and stream chunks of the media content 118 to the remote Client Device 102 for remote viewing. If the remote access whitelist 310 indicates that there is a limit on the number of concurrent streams of the media content 118 that can be transmitted to various remote Client Devices 102, then the Media Server 100 can determine whether the number of streams of that media content 118 exceeds the maximum value and provide a newly requested stream to a Client Device 102 if the maximum number of streams has not been reached. By way of a non-limiting example, the remote access whitelist 310 can indicate that streaming of media content 118 from a particular channel is authorized, and can include a maximum number of concurrent streams for media content 118 from that channel that is authorized to be streamed to remote Client Devices 102. In other embodiments, the maximum number of concurrent streams of media content 118 listed for a channel can refer to a maximum number of streams of media content 118 from all channels, including the requested one.

In some embodiments, the default number of concurrent streams can be set to one, but the number of authorized concurrent streams can be set to any desired number for any particular instance of media content 118 and/or all media content from any particular channel to which the Media Server is or has been tuned or to a desired number of authorizied concurrent streams of media content 118 from all channels, including the requested one. By way of a non-limiting example, if the remote access whitelist 310 indicates that only one concurrent stream for media content 118 from a particular channel is allowed, the first authorized Client Device 102 to request that media content 118 can be provided with the stream, while other Client Devices can be precluded from accessing a stream of media content 118 from that channel until the first Client Device 102 ceases accessing the stream.

If the remote access whitelist 310 indicates that copying of the media content 118 to a remote Client Device's local storage is approved, then the Media Server 100 can transfer a copy of the media content 118 to the remote Client Device 102. As discussed above, the Media Server can check a copy restriction list 308 to determine whether a maximum copy limit has been reached for the requested media content 118 before transferring the media content 118 to the requesting remote Client Device 102.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed:

1. A method of granting a client device remote access to a media server, comprising:
    receiving a port request from a remote client device at a residential gateway through an intermediate remote access control server over a wide area network, said residential gateway operating a local area network to which a media server is connected;
    opening one or more wide area network ports temporarily mapped to local area network ports, such that said remote client device can communicate with said media server through said wide area network ports;
    transmitting a list of said one or more wide area network ports to said remote client device through said intermediate remote access control server;
    receiving a media content request from said remote client device and passing said media content request to said media server through said one or more wide area network ports; and
    passing media content from said media server to said remote client device through said one or more wide area network ports in response to said media content request, wherein said media server uses one or more restriction lists each comprising one or more parameters indicating remote access permissions by channel to determine whether to send said media content to said remote client device and wherein use of the restriction lists avoids use of security authentication to enable access through said one or more wide area network ports.

2. The method of claim 1, wherein at least one parameter of said one or more restriction lists indicates whether streaming of media content being received live at said media server from a particular channel is authorized.

3. The method of claim 1, wherein said one or more restriction lists describes a maximum number of concurrent streams that indicates how many remote client devices are authorized to receive streams of media content from a particular channel at any one time.

4. The method of claim 3, wherein said maximum number of concurrent streams is a maximum number of concurrent streams of a live broadcast of media content being received in real time from said particular channel at said media server and of any previously completed recording of media content recorded from said particular channel stored on said media server.

5. The method of claim 3, wherein said media content request is rejected when said maximum number of concurrent streams for said media content from said particular channel is already being provided to other client devices.

6. The method of claim 3, wherein said maximum number of concurrent streams is one.

7. The method of claim 1, wherein said one or more restriction lists describes a maximum number of concurrent streams that indicates how many remote client devices are authorized to receive streams of media content at any one time, as listed with reference to the channel requested.

8. The method of claim 7, wherein said maximum number of concurrent streams is a maximum number of concurrent streams of a live broadcast of media content being received in real time at said media server and of any previously completed recording of media content stored on said media server.

9. The method of claim 7, wherein said media content request is rejected when said maximum number of concurrent streams is already being provided to other client devices.

10. The method of claim 1, wherein said residential gateway opens a first wide area network port for web service signaling between said remote client device and said media server, a second wide area network port for media content exchange between said remote client device and said media server, and a third wide area network port for security communications between said remote client device and said media server.

11. A media server, comprising:
one or more tuners configured to tune into channels;
a communications link configured to communicate with one or more remote devices to transmit a media stream of a channel being received by one of said one or more tuners to said one or more remote devices; and
a database of one or more restriction lists each comprising one or more parameters indicating remote access permissions by channel, wherein said one or more restriction lists determine whether to send said media stream to said a particular remote client device and wherein use of the restriction lists avoids use of security authentication to enable access through said one or more wide area network ports.

12. The media server of claim 11, wherein at least one parameter of said one or more restriction lists indicates whether streaming of media content being received live at one of said one or more tuners from a particular channel is authorized.

13. The media server of claim 11, wherein said one or more restriction lists describes a maximum number of concurrent streams that indicates how many remote client devices are authorized to receive streams of media content from a particular channel at any one time from said media server.

14. The media server of claim 13, wherein said maximum number of concurrent streams is a maximum number of concurrent streams of a live broadcast of media content being received in real time from said particular channel at one of said one or more tuners and of any previously completed recording of media content recorded from said particular channel stored on a storage device within said media server.

15. The media server of claim 13, wherein said media content request is rejected when said maximum number of concurrent streams for said media content from said particular channel is already being provided to other client devices.

16. The media server of claim 13, wherein said maximum number of concurrent streams is one.

* * * * *